(12) United States Patent
Hiranuma (10) Patent No.: US 11,409,259 B2
(45) Date of Patent: Aug. 9, 2022

(54) INFORMATION PROCESSING DEVICE FOR CONFIGURING AND DISPLAYING USER CUSTOMIZED INFORMATION

(71) Applicant: Fanuc Corporation, Yamanashi (JP)

(72) Inventor: Takuya Hiranuma, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/655,405

(22) Filed: Oct. 17, 2019

(65) Prior Publication Data

US 2020/0142382 A1 May 7, 2020

(30) Foreign Application Priority Data

Nov. 5, 2018 (JP) .............................. JP2018-208425

(51) Int. Cl.
*G05B 19/4063* (2006.01)
*G05B 19/4068* (2006.01)

(52) U.S. Cl.
CPC ..... *G05B 19/4063* (2013.01); *G05B 19/4068* (2013.01); *G05B 2219/32128* (2013.01); *G05B 2219/34456* (2013.01); *G05B 2219/35488* (2013.01)

(58) Field of Classification Search
CPC .............. G05B 19/409; G05B 19/4063; G05B 19/4068; G05B 2219/32128; G05B 2219/34456; G05B 2219/35488; G06F 3/0488
See application file for complete search history.

(56) References Cited

U.S. PATENT DOCUMENTS

| | | | | |
|---|---|---|---|---|
| 5,291,190 A | * | 3/1994 | Scarola | G21D 3/08 340/3.32 |
| 8,413,889 B1 | * | 4/2013 | Devarasetty | G06Q 30/0241 235/379 |
| 9,798,315 B2 | * | 10/2017 | Rieger | G05B 19/4093 |
| 10,949,740 B2 | * | 3/2021 | Kurokawa | G06N 3/08 |
| 2013/0173031 A1 | * | 7/2013 | Liang | G05B 19/409 700/83 |
| 2015/0264206 A1 | | 9/2015 | Maeda | |
| 2016/0072972 A1 | | 3/2016 | Akuzawa | |
| 2016/0227055 A1 | | 8/2016 | Ishino et al. | |

(Continued)

FOREIGN PATENT DOCUMENTS

| | | |
|---|---|---|
| JP | 2000-066709 A | 3/2000 |
| JP | 2004243472 A | 9/2004 |

(Continued)

OTHER PUBLICATIONS

Japanese Notice of Reasons for Refusal for Japanese Application No. 2018-208425, dated Mar. 2, 2021 with translation, 6 pages.

*Primary Examiner* — Jennifer N Welch
*Assistant Examiner* — Amy P Hoang
(74) *Attorney, Agent, or Firm* — RatnerPrestia (57) ABSTRACT

An information processing device configured to display information on a plurality of machines in a plant in where a plurality of users and the machines individually having a plurality of modes are present is provided with a screen customization unit configured to generate layout information on a custom screen and a layout information holding unit configured to store the layout information in association with the users, the machines, and the modes.

5 Claims, 6 Drawing Sheets

(56) References Cited

U.S. PATENT DOCUMENTS

2017/0123820 A1* 5/2017 Nishi ............... G05B 19/41825
2019/0056855 A1* 2/2019 Ceccherini ....... G06Q 10/06375

FOREIGN PATENT DOCUMENTS

| JP | 2015099420 A | 5/2015 |
|----|--------------|--------|
| JP | 2015174298 A | 10/2015 |
| JP | 2016057697 A | 4/2016 |
| JP | 2016144152 A | 8/2016 |

* cited by examiner

MODE 1

. . . .

MODE m

INFORMATION PROCESSING DEVICE FOR CONFIGURING AND DISPLAYING USER CUSTOMIZED INFORMATION

RELATED APPLICATIONS

The present application claims priority to Japanese Patent Application Number 2018-208425 filed Nov. 5, 2018, the disclosure of which is hereby incorporated by reference herein in its entirety.

BACKGROUND OF THE INVENTION

Field of the Invention

The present invention relates to an information processing device, and more particularly, to an information processing device configured to generate original screens for each user, machine, and mode.

Description of the Related Art

A numerical controller is provided with various functions, which have their respective display screens. Conventionally, users used to operate and confirm the functions while switching those screens by means of MDI keys or the like. Since a plurality of screens cannot be simultaneously watched, however, satisfactory operability cannot be ensured.

If information on a plurality of functions is compiled on a screen, labor for switching a plurality of screens can be eliminated. Since necessary information varies depending on the users and work contents, however, the provided screen does not always fit the users.

Moreover, many industrial machines (hereinafter simply referred to as "machines"), such as machine tools, mounted with numerical controllers are operating in recent plants. Although a user not infrequently operates a plurality of machines, the contents of his/her work may sometimes vary greatly for each machine.

If the user can easily create the screen that meets these sophisticated requirements, necessary information can be obtained without excess or deficiency to ensure convenience. Therefore, a function for the user to customize the screen by him/herself is demanded. As one such function, a control device that can create custom screens according to some types of display patterns as bases is described in, for example, Japanese Patent Application Laid-Open No. 2000-066709.

The field of machines has the following four problems.

(1) Necessary information varies depending on the work contents (operation mode). Although a custom screen creating function is also conventionally provided, it cannot be saved in association with the operation mode. It takes time to re-create a custom screen every time the operation mode is changed.

(2) Necessary information varies depending on each line or machine. Although the custom screen creating function is also conventionally provided, it cannot be saved in association with the machine. It takes time to re-create a custom screen every time the machine to be operated is changed.

(3) Necessary information varies depending on the user who uses numerical control. Although the custom screen creating function is also conventionally provided, it cannot be saved in association with the user. It takes time to re-create a custom screen every time the user is changed. Moreover, the presence of screens (showing specific parameters, machining programs, etc.) that prohibit the user's inspection and editing is also an obstacle to the reuse of the custom screen.

(4) If custom screens are created for each mode, each machine, and each user, their number is enormous. It is not efficient for each user to create screens one by one. Thus, there is a demand for means for easily creating the custom screens.

All these problems are not solved by prior art techniques (e.g., Japanese Patent Application Laid-Open No. 2000-066709).

SUMMARY OF THE INVENTION

Information processing device configured to generate original screens for each user, machine, and mode is required.

An information processing device of one aspect of the present disclosure is an information processing device which displays information on a plurality of machines in a plant where a plurality of users and the machines individually having a plurality of modes are present, and comprises a screen customization unit configured to generate layout information on a custom screen and a layout information holding unit configured to store the layout information in association with the users, the machines, and the modes.

The information processing device of one aspect of the present disclosure can further comprise a screen display unit configured to acquire the layout information corresponding to the users operating the machines and the modes of the machines from the layout information holding unit and display the custom screen based on the layout information.

The screen customization unit of one aspect of the present disclosure can limit screen parts registerable on the custom screen based on the authority levels of the users.

The screen display unit of one aspect of the present disclosure can limit screen parts displayable on the custom screen based on the authority levels of the users.

The layout information holding unit of one aspect of the present disclosure may be configured to hold the layout information on the plurality of machines so as to enable access from another information processing device.

One aspect of the present disclosure, based on the structure described above, can provide an information processing device capable of generating original screens for each user, machine, and mode.

DETAILED DESCRIPTION OF THE PREFERRED EMBODIMENTS

Embodiment 1

Figure 1:
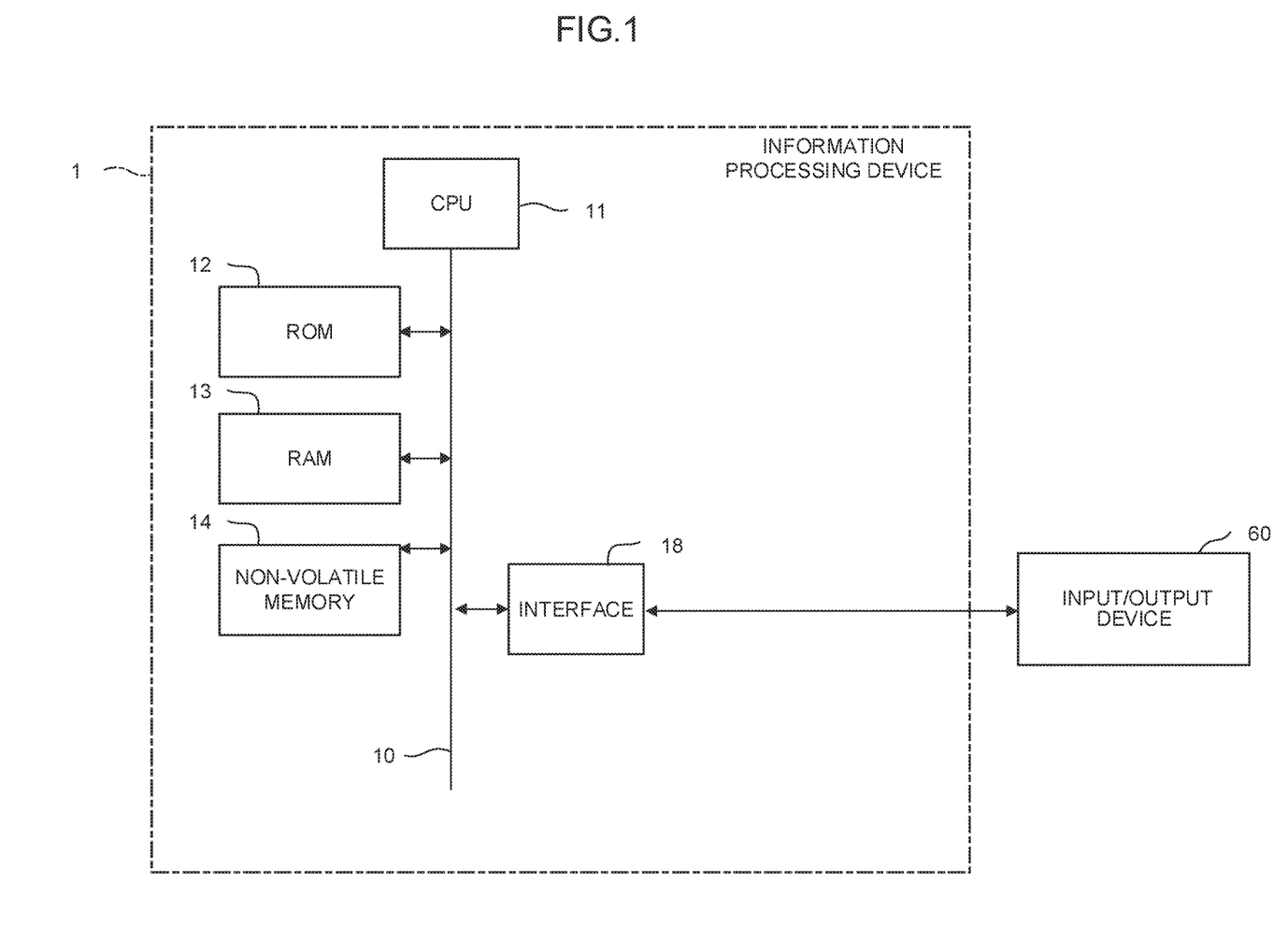
FIG. 1 is a diagram showing a hardware configuration of an information processing device.

FIG. 1 is a schematic hardware configuration diagram showing principal parts of an information processing device 1 according to an embodiment. While the information processing device 1 is typically a numerical controller, it may be any information processing device that can display and edit screens used in a numerical controller. For example, it may be a host device of the numerical controller. The information processing device 1 comprises a CPU 11, ROM 12, RAM 13, non-volatile memory 14, bus 10, axis control circuit 16, servo amplifier 17, and interface 18. The information processing device 1 is connected with a servomotor 50 and an input/output device 60.

The CPU 11 is a processor for generally controlling the information processing device 1. The CPU 11 reads out a system program stored in the ROM 12 via the bus 10 and controls the entire information processing device 1 according to the system program.

The ROM 12 is previously loaded with system programs for executing various controls of machines, for example.

The RAM 13 temporarily stores temporary calculation data and display data, data and programs input by an operator through the input/output device 60, and the like.

The non-volatile memory 14 is backed by, for example, a battery (not shown) so that its storage state can be maintained even when the information processing device 1 is switched off. The non-volatile memory 14 stores data, programs, and the like input through the input/output device 60. The programs and data stored in the non-volatile memory 14 may be developed in the RAM 13 during execution and use.

The input/output device 60 is a data input/output device equipped with a display, hardware keys, and the like, and is typically an MDI or control panel. The input/output device 60 displays information received from the CPU 11 through the interface 18 on the display. The input/output device 60 delivers commands and data input from the hardware keys and the like to the CPU 11 through the interface 18. In the present embodiment, a screen displayed by the information processing device 1 is displayed on the display of the input/output device 60. Moreover, the screen is operated by means of the MDI or the like of the input/output device 60.

Figure 2:
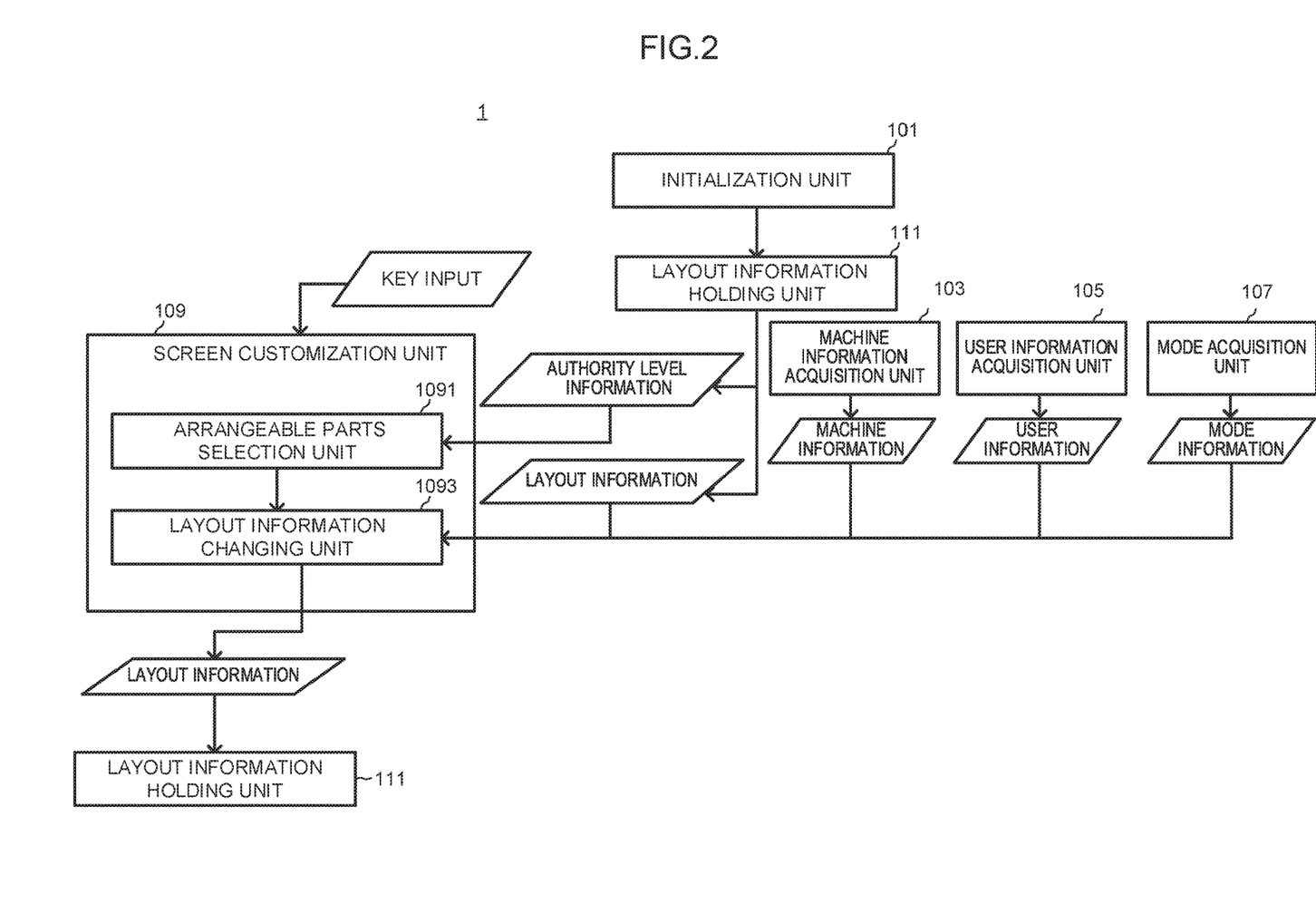
FIG. 2 is a diagram showing a functional configuration of the information processing device.
Figure 3:
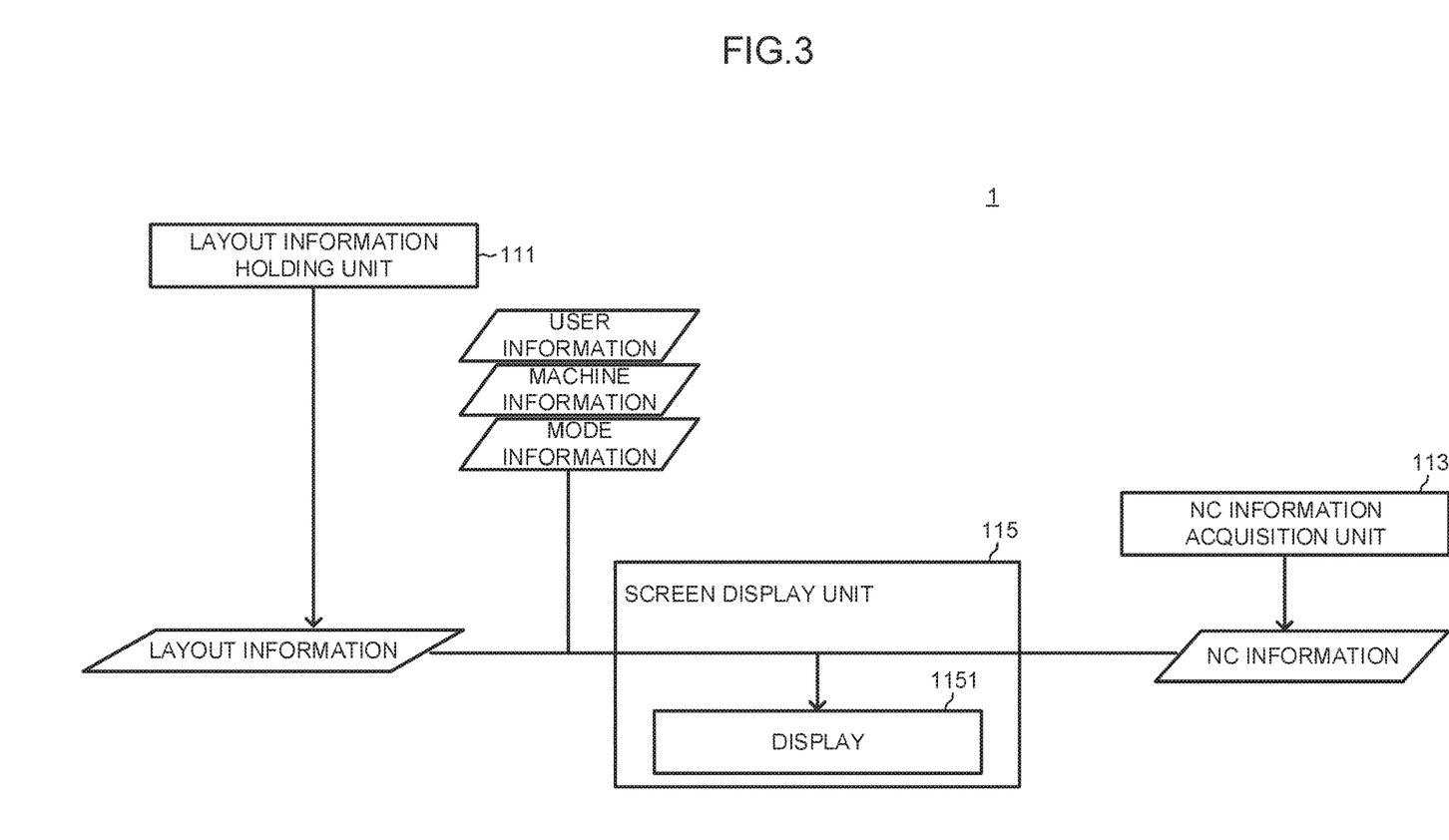
FIG. 3 is a diagram showing a functional configuration of the information processing device.

FIGS. 2 and 3 are block diagrams showing functional configurations of the information processing device 1. FIG. 2 shows a functional block of processing for creating customization screens for each mode, each machine, and each user, and FIG. 3 shows a functional block of processing for displaying the customization screens for each mode, each machine, and each user.

The information processing device 1 comprises an initialization unit 101 for initialization processing (described later), user information acquisition unit 105, machine information acquisition unit 103, mode acquisition unit 107, screen customization unit 109, layout information holding unit 111, NC information acquisition unit 113, and screen display unit 115. The user information acquisition unit 105 acquires user information on users. The machine information acquisition unit 103 acquires machine information on machines used by the users. The mode acquisition unit 107 acquires mode information on modes used in the machines.

The screen customization unit 109 comprises an arrangeable parts selection unit 1091 and a layout information changing unit 1093 for editing custom screens. The layout information holding unit 111 holds information on the created custom screens. The NC information acquisition unit 113 acquires NC information on the numerical controller (NC). The screen display unit 115 displays the custom screens on a display 1151.

The processing for creating the customization screens will be described with reference to FIG. 2. Specifically, the following is a description of the operation of each of processing units for the processing for creating the customization screen for each mode, the processing for creating the customization screen for each machine, and the processing for creating the customization screen for each mode, the processing for creating the customization screen for each user, and the initialization processing.

<Customization Screen for Each Mode>

The information processing device 1 generates the custom screen for each mode by the following series of processing steps.

User's selection of one of screen division patterns prepared in advance.

Figure 4:
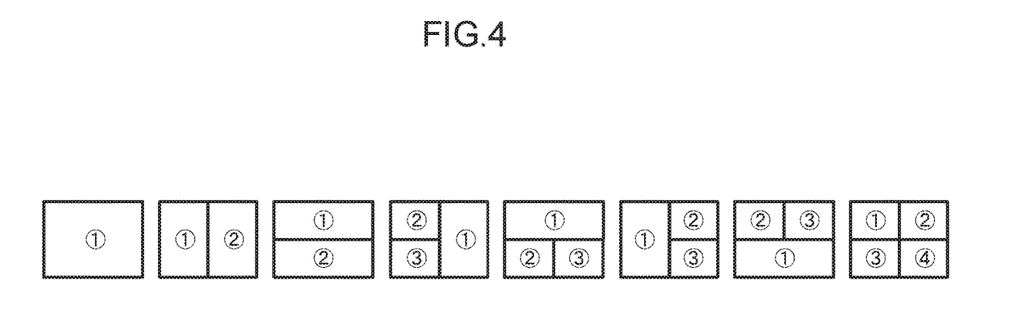
FIG. 4 is a diagram showing examples of screen division patterns.

The layout information changing unit 1093 of the screen customization unit 109 acquires one or more screen division patterns provided in advance from a storage area (not shown) and presents them to the user. FIG. 4 shows examples of the screen division patterns. The screen division patterns are obtained by dividing a display area for one screen into a plurality of partial areas. Screen parts (described later) can be arranged in each partial area. The user selects one screen division pattern from presented candidates.

If there is any layout information (described later) already generated, other screen division patterns, as well as the existing layout information, can be presented to the user. Thus, the user can change the screen division patterns of the existing layout information.

Selection of previously defined screen parts and insertion thereof into screen division patterns.

Figure 5:
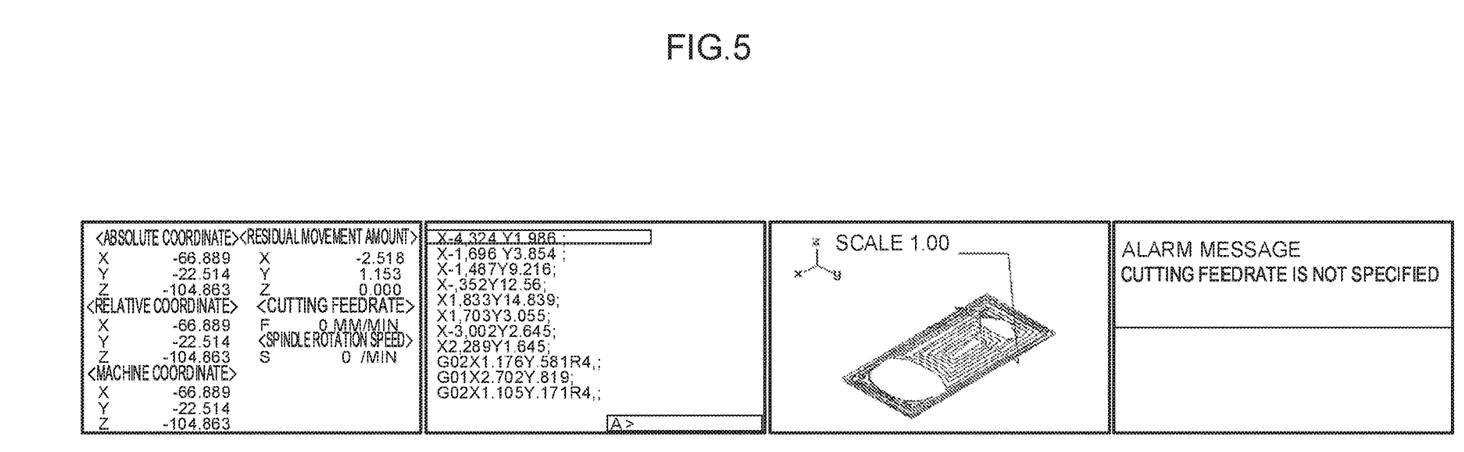
FIG. 5 is a diagram showing examples of screen parts.

The arrangeable parts selection unit 1091 of the screen customization unit 109 acquires one or more screen parts provided in advance from a storage area (not shown) and presents them to the user. FIG. 5 shows examples of the screen parts. The screen parts perform, for example, display of a machining program, display of the result of machining simulation, display of an alarm, and the like.

On this occasion, the arrangeable parts selection unit 1091 may be configured to refer to the user's authority level information and select only those screen parts which are allowed to be selected at the authority level concerned. In this case, it is assumed that the screen parts and the authority level at which the selection is allowed are associated in advance in the storage areas.

If there is any layout information (described later) already generated, other screen parts, as well as the existing layout information, can be presented to the user. Thus, the user can change the screen parts of the existing layout information.

Generation of layout information, which is combination of screen division pattern information and screen parts arrangement information.

The screen customization unit 109 generates the layout information, which is a set of screen division pattern information indicative of the screen division pattern selected by the user and arrangement information indicative of screen parts assigned to the partial areas of the screen division pattern concerned.

Storage of layout information in association with mode information.

The screen customization unit 109 stores the layout information holding unit 111 with the generated layout information in association with mode information indicative of the mode corresponding to the layout information concerned, machine information indicative of the machine in the mode concerned, and user information indicative of the user having generated the layout information concerned. The mode information, machine information, and user information can be acquired by the mode acquisition unit 107, machine information acquisition unit 103, and user information acquisition unit 105, respectively.

Figure 6:
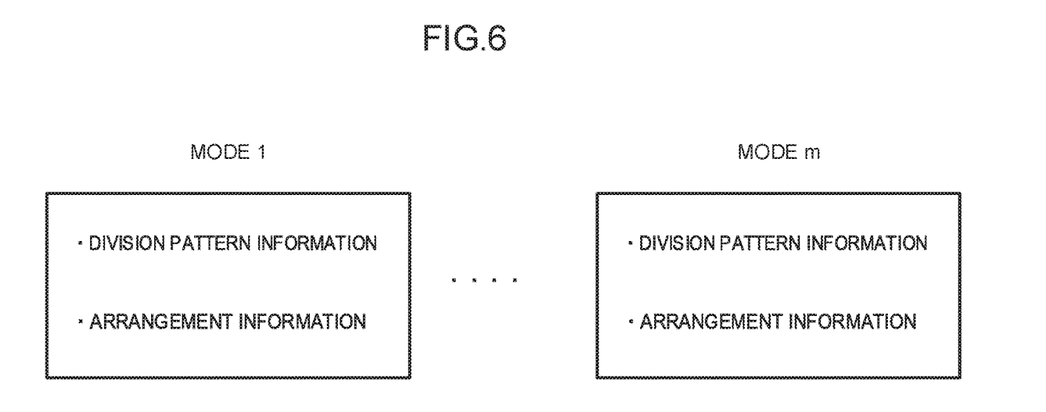
FIG. 6 is a diagram illustrating how layout information is created for each mode.

The custom screen can be generated for each mode by carrying out the above steps of processing individually for a plurality of modes. FIG. 6 shows a concept of the layout information generated by this processing. The layout information is created for each of modes 1 to m, and each piece of layout information holds the screen division pattern information and the arrangement information.

<Customization Screen for Each Machine>

The information processing device 1 generates the customization screen for each machine by the following processing.

Maintenance of layout information corresponding to number of machines.

The screen customization unit 109 performs the aforesaid processing for creating the customization screen for each mode for each of one or more machines. Thus, the layout information is generated for each machine and for each mode of each machine.

Figure 7:
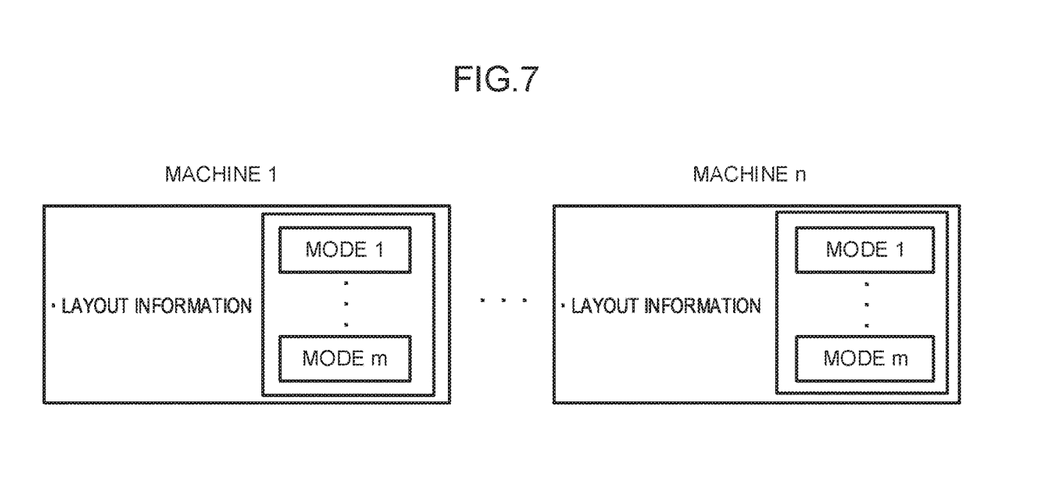
FIG. 7 is a diagram illustrating how layout information is created for each machine.

FIG. 7 shows a concept of the layout information generated by this processing. The layout information is created for each of machines 1 to n. The machines 1 to n hold those pieces of layout information which correspond to the modes 1 to m, respectively, and each piece of layout information holds the screen division pattern information and the arrangement information.

<Customization Screen for Each User>

As described above, the layout information is associated with the mode information, machine information, and user information. Thus, the layout information is generated for each user, for each machine used by each user, and for each mode of each machine.

Figure 8:
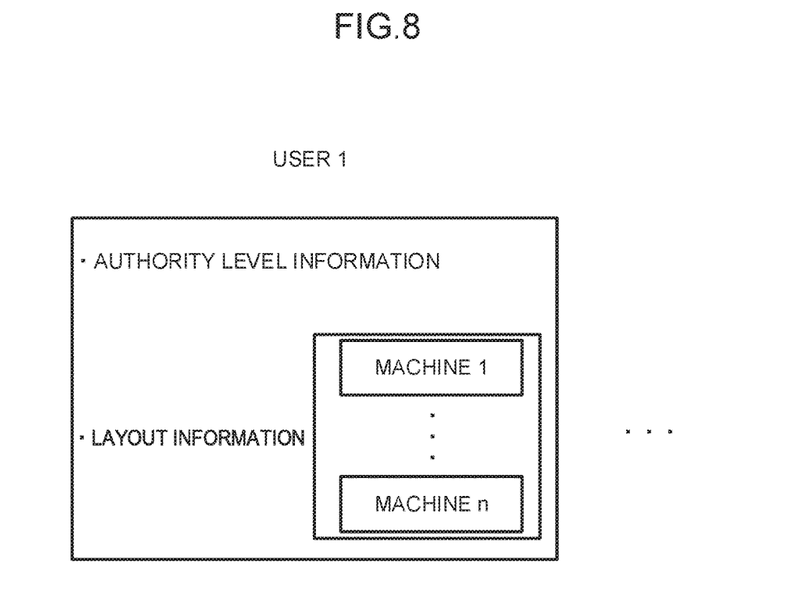
FIG. 8 is a diagram illustrating how layout information is created for each user.

FIG. 8 shows a concept of the layout information generated by the aforesaid series of processing steps. The layout information is created for each of users 1, 2, 3 . . . . The users 1, 2, 3 . . . hold those pieces of layout information which correspond to the machines 1 to n, respectively, the machines 1 to n hold those pieces of layout information which correspond to the modes 1 to m, respectively, and each piece of layout information holds the screen division pattern information and the arrangement information. Moreover, authority levels are assigned individually to the users 1, 2, 3 . . . (as described later). These authority levels are also associated with the layout information of the users 1, 2, 3 . . . .

<Initialization Processing>

The initialization unit 101 perform the initialization processing when a new user is registered or when resetting of the layout information is commanded by an existing user. The initialization unit 101 clears the contents of the layout information of the user concerned stored in the layout information holding unit 111. Moreover, the initialization unit 101 acquires authority level information tied to the user information from a storage area (not shown). The authority level information is information that determines the screen part that can be selected or displayed by the user. The acquired authority level information is saved in association with the layout information of the user.

Processing for displaying the customization screen will be described with reference to FIG. 3.

The screen display unit 115 acquires user information indicative of the user currently performing an operation, machine information indicative of the machine to be operated, and mode information indicative of the current operation mode. Moreover, layout information tied to the user information, machine information, and mode information concerned is acquired with reference to the layout information holding unit 111.

The screen display unit 115 analyzes the acquired layout information and displays the custom screen on which the screen parts are arranged according to the screen division patterns. If the information to be displayed in the screen parts is information (NC information) related to the state of the numerical controller or the like, the NC information can be acquired from the NC information acquisition unit 113.

According to the present embodiment, the customization screen can be generated for each user, for each machine, and for each mode. By only switching the user and the mode on the machine, for example, desirable information for the user concerned in the mode concerned can be obtained with ease. Thus, one aspect of the present embodiment is particularly useful for screen creation in an environment where a plurality of users and a plurality of machines are present in a plant and the machines have a plurality of operation modes.

Moreover, according to the present embodiment, the screen parts that can be selected or displayed are limited depending on the authority levels of the users. Thus, the custom screen can be designed according to the authority levels.

The present embodiment is not limited to the above aspect and may be suitably modified without departing from its spirit. For example, the above aspect is mainly based on the assumption that all the constituent elements are mounted in a single information processing device 1. Alternatively, however, these constituent elements may be configured to be dispersedly mounted in a plurality of information processing devices 1 and to operate in cooperation with one another.

For example, a common layout information holding unit 111 may be provided in a host device that is connected for communication with a plurality of information processing devices 1 so that the information processing devices 1 can individually access the common layout information holding unit 111. Alternatively, a plurality of information processing devices 1 may be configured to communicate with one another so that one information processing device 1 can access the layout information holding unit 111 of another information processing device 1. According to this arrangement, custom screens can be created and the custom screens previously created by the users can be displayed in like manner without regard to the selection among the information processing devices 1 installed in the plant.

Moreover, the storage areas in which the screen division patterns and the screen parts are saved may also be a common storage area provided in the host device that is connected for communication with a plurality of information processing devices 1. Alternatively, a plurality of information processing devices 1 may be configured to communicate with one another so that one information processing device 1 can access the storage areas of another information processing device 1. Thus, custom screens can be created and the custom screens previously created by the users can be displayed in like manner without regard to the selection among the information processing devices 1 installed in the plant.

Alternatively, by standardizing the machine information for machines of the same model, for example, the custom screens previously created by the users can be used for other machines of the same model. Moreover, by standardizing the user information for users of a predetermined group, the custom screens can also be shared in common between the users. Thus, convenience under specific conditions can be further improved.

Alternatively, the initialization unit 101 may be configured to create a default custom screen for the users in performing the initialization processing. The default custom screen can be composed of recommended screen division patterns and screen parts for each authority level, machine, or mode, for example. Thus, the time required for creating the custom screen can be made shorter than in the case where the custom screen is created from the beginning. Moreover, the convenience is improved because a custom screen that satisfies specific requirements can be used without screen customization.

The invention claimed is:

1. An information processing device configured to display information on a plurality of machines in a plant where a plurality of users and the machines individually having a plurality of operation modes are present, the information processing device comprising:
  a processor configured to:
    acquire user information on a user of a custom screen;
    acquire machine information on a machine used by the user;
    acquire mode information on a mode used in the machine;
    receive selection of a screen division pattern that divides a screen into a plurality of partial areas;
    present screen parts corresponding to an authority level of the user, the screen parts allowed to the user to select;
    receive selection of screen parts fit to the authority level of the user that can be inserted into the screen division pattern;
    generate a plurality of layout information, each of the plurality of layout information including a combination of screen division pattern information indicating a division of a display area into a plurality of partial areas, and screen parts arrangement information indicating a display of machining information within the plurality of partial areas;
    store each of the plurality of layout information created for each of the users, in a way that layout information which correspond to the machines and the operation modes used in the machines; and
    in response to a request to control a machine in an operation mode:
      acquire user information indicative of the user currently performing an operation, machine information indicative of the machine to be operated, and operation mode information indicative of the current operation mode of the machine,
      acquire stored layout information tied to the user information, the machine information, and the operation mode information, and
      display a custom screen based on the combination of the screen division pattern information and the screen parts arrangement information included in the layout information.

2. The information processing device according to claim 1, wherein the processor is further configured to acquire the layout information corresponding to the users operating the machines and the modes of the machines and display the custom screen based on the layout information.

3. The information processing device according to claim 1, wherein the processor is further configured to limit screen parts registerable on the custom screen based on the authority levels of the users.

4. The information processing device according to claim 2, wherein the processor is further configured to limit screen parts displayable on the custom screen based on the authority levels of the users.

5. The information processing device according to claim 1, wherein the processor is further configured to hold the layout information on the plurality of machines so as to enable access from another information processing device.

* * * * *